Figure 1:
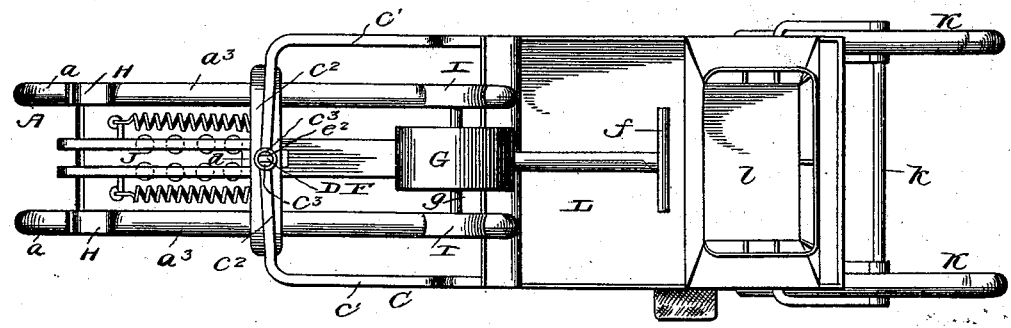

(No Model.) 2 Sheets—Sheet 1.
C. H. BARROWS.
MOTOR VEHICLE.

No. 567,445. Patented Sept. 8, 1896.

Witnesses:

Chas. H. Barrows,
Inventor (No Model.) 2 Sheets—Sheet 2.
C. H. BARROWS.
MOTOR VEHICLE.
No. 567,445. Patented Sept. 8, 1896.
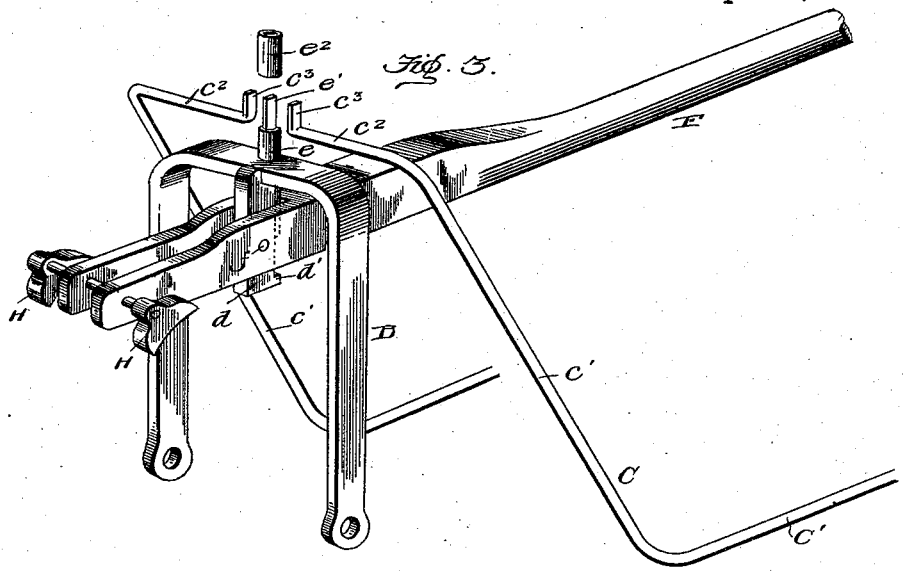
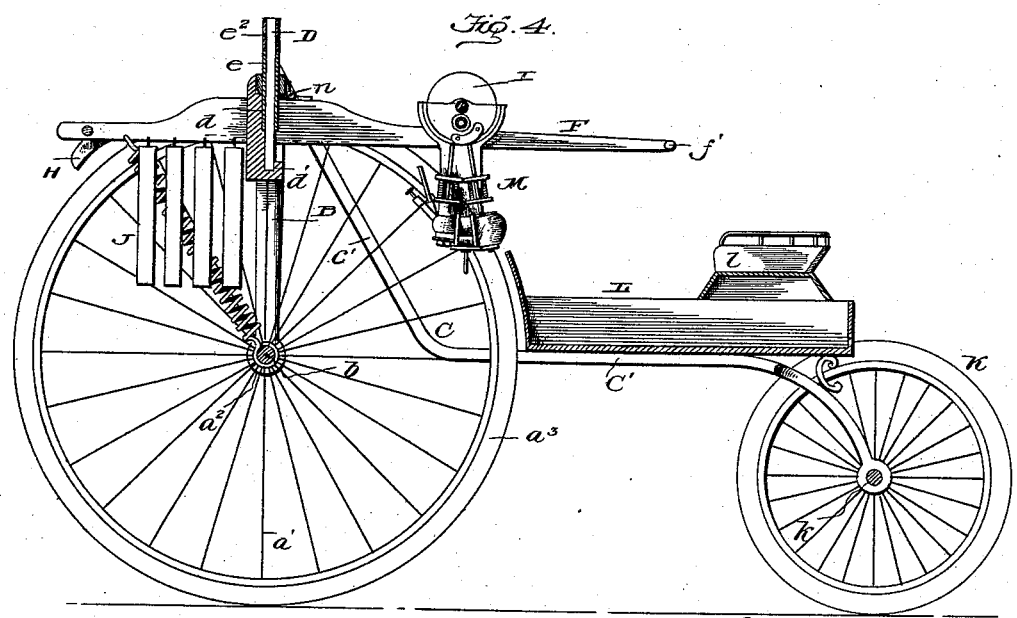

UNITED STATES PATENT OFFICE.

CHARLES H. BARROWS, OF WILLIMANTIC, CONNECTICUT.

MOTOR-VEHICLE.

SPECIFICATION forming part of Letters Patent No. 567,445, dated September 8, 1896.

Application filed January 17, 1896. Serial No. 575,905. (No model.)

*To all whom it may concern:*

Be it known that I, CHARLES H. BARROWS, a citizen of the United States, residing at Willimantic, in the county of Windham and State of Connecticut, have invented certain new and useful Improvements in Motor-Vehicles; and I do hereby declare the following to be a full, clear, and exact description of the invention, such as will enable others skilled in the art to which it appertains to make and use the same.

In my present improvement in motor-vehicles I have in view the provision of a novel organization of the steering, propulsion, and braking mechanism which are so arranged that the power of the motor may be applied to propel the vehicle at the desired speed without the provision of special speed-reducing gearing, of clutch devices, or other accessory mechanism, while at the same time the steering devices are under the easy control of the motorman for the purpose of guiding the vehicle and for regulating its speed, and the brake device can be operated to retard or arrest the vehicle by continuing the movement that disengages the motor from the driving-wheel. These several mechanisms are combined in the simplest practicable manner, so as to reduce to a minimum the number of parts and yet place the propulsion and controlling devices wholly at the control of the motorman.

With these ends in view the leading feature of my invention consists of a steering handle or lever carrying a motor to be engaged with or disengaged from the driving-wheel of the machine in a manner to avoid interfering with the movement or adjustment of the steering handle or bar necessary to the guidance of the vehicle.

The invention further consists in a steering handle or lever which is hung or connected at an intermediate point of its length with the fork or frame of the steering-wheel, combined with a brake shoe or shoes carried on one end of the steering handle or lever, and a propelling-motor carried by the handle or lever on the opposite side of the fulcrum of said handle or lever from the brake shoe or shoes, the parts being so organized that a movement of the steering-handle in one direction throws the motor into engagement with the driving-wheel and moves the brake-shoes away from said wheel; but a reverse movement of the lever operates to move the motor out of engagement with the driving-wheel and at the same time applies the brake-shoes to the driving-wheel.

The invention further consists in the novel combination of devices and in the construction and arrangement of parts which will be hereinafter fully described and claimed.

To enable others to understand my invention, I have illustrated the different embodiments of the same in the accompanying drawings, forming a part of this specification, and in which—

Figure 2:
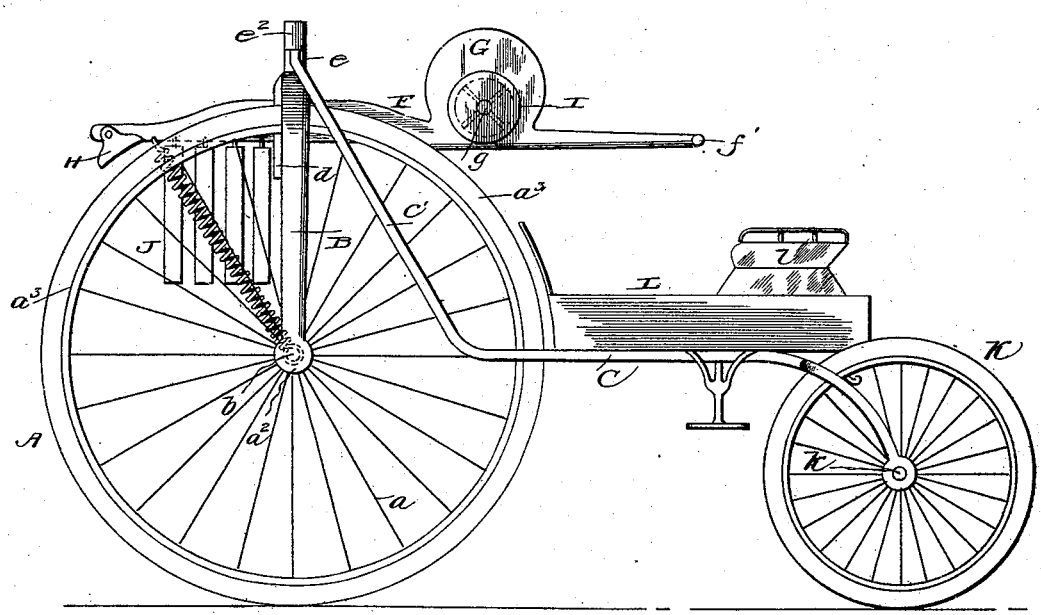

Figure 1 is a plan view of one embodiment of my motor-vehicle in which an electric motor is mounted on the steering handle or lever. Fig. 2 is a side elevation of the same. Fig. 3 is a detail perspective view of one construction of the frame or fork for the steering and driving wheel, the steering handle or lever, and a part of the frame. Fig. 4 is a sectional elevation of another embodiment of the vehicle in which a gas or explosive engine is mounted on the steering handle or lever in a manner to utilize the power of the engine-shaft for application to the driving and steering wheel of the vehicle.

Like letters of reference denote corresponding parts in all the figures of the drawings.

Referring more particularly to the embodiment of my invention illustrated by Figs. 1 to 3, inclusive, the letter A designates the front wheel, which serves both as the steering-wheel and as the propelling-wheel. This wheel is a duplex one, that is to say, it has two rims or treads carried on a single axle. In practice I may make this wheel with two fellies $a$ $a$, two sets of spokes $a'$, a single hub $a^2$, and with resilient tires $a^3$, seated on the fellies $a$ $a$, but the detailed construction of this duplex wheel may be varied within wide limits without departing from my invention. The hub $a^2$ of the duplex wheel is fitted in a suitable way to a non-rotating axle $b$, which is mounted in the lower ends of the fork or frame B, which fork serves as the support for the front end of the main carrying-frame C. I prefer to construct the front part of the carrying-frame C and the fork or front wheel-frame B in the manner shown more clearly by Fig. 3 of the drawings. The side bars $c$ $c$ of this carrying-frame have their front ends inclined or curved upwardly, as at $c'$, thence inwardly at $c^2$, and thence upwardly to form the short arms $c^3$.

The front wheel frame or fork B is made with two legs and a cross-head similar to the steering-forks of bicycles, except that the legs are spaced somewhat farther apart in order to accommodate the duplex wheel A. To this head of the fork B is rigidly mounted a pendant $d$, having a step-bearing $d'$ at its lower end. Passing through the head of the fork is a long sleeve or bearing $e$, and in this sleeve is fitted the vertical king-bolt or spindle D, which spindle has its lower end fitted in the step-bearing $d'$, carried by the pendant $d$. The upper end of the king-bolt or spindle D is squared or made polygonal in form, as at $e'$, and said end $e'$ protrudes above the sleeve $e$ to enable the arms $c^2$ of the frame-bars $c$ to be fitted against opposite sides of the polygonal end $e'$ of the king-bolt, said ends $c^2$ of the frame-bars and the king-bolt being securely united together by means of a clasp or coupling $e^2$, which is shown as fitting around the ends $c^2$ $e'$ of said frame C and king-bolt.

F is the steering handle or lever which carries a motor or engine G and the brake shoe or shoes H. The steering handle or lever is preferably made or fashioned as an open frame to adapt it to straddle or embrace the pendant $d$, rigid with the steering-fork B, and this lever or handle F is fulcrumed at an intermediate point of its length by a pivotal bolt $f$, which passes through the lever or handle F and the pendant $d$. Said steering handle or lever passes between the spaced rims or treads of the duplex wheel and below the head of the steering-fork, so that the front end of the lever or handle F projects beyond one side of the wheel A and its rear end projects beyond the rear side of said wheel, as shown. This rear end of the lever is formed into or provided with a suitable handle $f'$, which is within convenient reach of the motorman or steersman seated on the vehicle. On this lever F between its handle $f'$ and the fulcrum $f$ is mounted the motor or engine G. The character of the motor illustrated by Figs. 1 and 2 is an electric motor which has its bed or foundation plate fastened in any suitable way to the frame-like lever F. The motor-shaft $g$ extends beyond the sides of the lever F, and on the ends of said shaft $g$ is keyed or otherwise secured the driving-pulleys I I, which are adapted to have frictional contact with the tires $a^3$ of the duplex driving-wheel A. As shown, the tires $a^3$ of the duplex wheel A are made with convex treads, but the treads of the driving-pulleys are concave to adapt the pulleys to have close frictional engagement with the duplex wheel; but this is not material, and the parts may be reversed or given other forms at the option of skilled mechanics.

The brake shoe or shoes H are fixed to the front end of the steering lever or handle, and said shoes are arranged on the lower side of the lever or handle, so as to face toward the treads of the duplex wheel. I prefer to balance the lever or handle F so that it will be in a substantially horizontal position with its brake-shoes and the driving-pulleys L of the motor out of engagement with the treads of the duplex wheel. This lever may be balanced against the weight of the motor G by suspending cells of an electric storage battery from the end of the lever F, which carries the brake-shoes H, as indicated at J. Enough of these cells to counterbalance the weight of the electric motor may be suspended from the lever F, while the remaining cells of the storage battery may be arranged on supports suspended between the rims of the wheel A. It is to be understood that the cells are to be coupled together and to the motor in well-known ways to supply current of electrical energy sufficient to run the motor G. If preferred, the lever F may be balanced against the weight of the motor by suspension or pressure springs, or a system of weighted levers or other appliances which may be arranged compactly with relation to the vehicle.

The rear part of the main carrying-frame C supports a suitable low-down axle $k$, on which is fitted the rear wheels K, the latter being preferably equipped with inflatable tires. On the frame C is supported the body L, having the seat $l$, all of which parts may be of any suitable or preferred construction.

In order to secure great leverage on the front wheel and to apply the power efficiently and economically, I make this front wheel A of much greater diameter than the rear carrying-wheels K.

To start the vehicle, the attendant presses down on the handle $f'$ to move the lever F in a direction to bring the motor-driven pulleys I into frictional contact with the treads of the duplex wheel. The lever F is depressed far enough to press the pulleys I into such contact with the duplex wheel as to rotate the same and propel the vehicle at a low speed; but when it is desired to increase the speed the lever F may be still further pressed down to increase the frictional contact between the driving-pulleys and the duplex wheel and thereby decrease the extent of "slip" between the pulleys and wheel, so as to rotate the wheel A and propel the vehicle at faster speed. The motor may rotate continuously and the speed of the vehicle may be governed by regulating the frictional contact between the duplex wheel A and the motor-driven pulleys I. A suitable rheostat and switch mechanism is provided by which the number of cells in the electric circuit may be regulated to supply a current of more or less energy to the motors. To stop the vehicle, the operator releases or lifts the lever F to raise the motor-driven wheels out of engagement with the duplex wheel. If the vehicle is traveling at a fast speed, the handle $f'$ of the lever is raised far enough to press the other end of the lever down to a point where the brake-shoes come into engagement with the duplex wheel A so as to arrest the vehicle, but if the vehicle is traveling at a slow gait it may not be necessary to raise the lever F far enough to bring the brake-shoes against the wheel. To steer the vehicle, the attendant simply turns the handle $f'$ and lever F to the right or left, and with this lever F turns the fork B and the front wheel A, the fork B and the sleeve $e$ turning around the fixed king-bolt or spindle D.

In Fig. 4 of the drawings I have illustrated an explosive gas or hydrocarbon motor in connection with my improved vehicle. This gas-engine M which I employ may be of any approved or preferred pattern, and this engine may be hung bottom side up under the steering-lever, so as to be supported thereby, and said engine may be arranged vertically on the lever F, or it may be arranged horizontally on the top side of the lever. The engine-shaft is so arranged that the driving-pulleys will engage with the treads of the duplex wheel, and the weight of this engine is distributed on the lever, or it may be wholly or partially balanced by springs, weighted levers, or other checking appliances. In this embodiment of my vehicle the lever F is hung by a large hinge, as at $n$.

I do not limit myself to the construction and arrangement of parts herein shown and described under different embodiments of my invention, because I am aware that the details can be varied by a skilled mechanic without departing from the spirit or sacrificing the advantages of my invention, as, for instance, the steering-fork may have the lever swiveled thereto above the head of the fork, or the frame C and fork B may be coupled together in a different way than that shown by Fig. 3, or spur gear-wheels may be used on the wheel A and in lieu of the friction-pulleys I. I therefore reserve the right to make such modifications and changes as fairly fall within the scope of my invention, the gist of which consists in a steering-lever connected to a steering-fork of a propelling and steering wheel, combined with a motor which is carried by said steering-lever in a manner to be engaged with and disengaged from said wheel; also in a brake device also mounted on the steering-lever and movable therewith into and out of engagement with the said wheel.

Having thus fully described my invention, what I claim as new, and desire to secure by Letters Patent, is—

1. In a motor-vehicle, the combination of a steering lever or handle, and a motor carried by said handle or lever and movable therewith into and out of engagement with a wheel, substantially as and for the purposes described.

2. In a motor-vehicle, the combination with a steering-lever, of a motor carried by said lever on one side of its fulcrum, and a brake device also carried by said lever but on the opposite side of its fulcrum from the motor, substantially as described.

3. In a motor-vehicle, the combination with a steering-fork, and a steering and driving wheel, of a steering-lever fulcrumed to said steering-fork, a motor carried by said lever and movable therewith into and out of engagement with said wheel, and a brake device also carried by the steering-lever to ride upon and be free from said wheel, substantially as and for the purposes described.

4. In a motor-vehicle, the combination with a steering and driving wheel, and a steering-fork, of a steering-lever, a motor, and a brake mechanism; said motor and brake mechanism carried by the lever on opposite sides of its fulcrum and said parts movable with the steering-lever to alternately ride upon said wheel, substantially as described.

5. In a motor-vehicle, the combination with a steering and driving wheel, and a fork, of a steering-lever hung on the fork, a motor carried by the steering-lever, and mechanism to counterbalance with the weight of the motor on said steering-lever, substantially as and for the purposes described.

6. In a motor-vehicle, the combination with a steering-fork, of a duplex wheel journaled on said fork, a steering-lever hung to said fork, a motor carried by said steering-lever, and wheels driven by the motor and arranged on the lever to be thrown into and out of engagement with said duplex wheel by proper movements of said steering-lever, substantially as described.

7. In a motor-vehicle, the combination with a steering-fork, and a wheel, of a spindle or king-bolt passing through the head of said fork, a pendant rigid with the lever, a steering-lever hung on said pendant, a motor carried by the lever, and a wheeled frame coupled to the spindle or king-bolt, substantially as described.

In testimony whereof I affix my signature in presence of two witnesses.

CHARLES H. BARROWS.

Witnesses:
 ALLEN B. LINCOLN,
 JOHN G. MITCHELL.